(12) United States Patent
Eilenberger

(10) Patent No.: US 11,387,700 B2
(45) Date of Patent: Jul. 12, 2022

(54) ELECTRIC CONDUCTOR FOR USE IN ELECTRIC MACHINES

(71) Applicant: Miba eMobility GmbH, Laakirchen (AT)

(72) Inventor: Andreas Eilenberger, Lengenfeld (AT)

(73) Assignee: Miba eMobility GmbH, Laakirchen (AT)

( * ) Notice: Subject to any disclaimer, the term of this patent is extended or adjusted under 35 U.S.C. 154(b) by 0 days.

(21) Appl. No.: 17/050,912

(22) PCT Filed: May 28, 2019

(86) PCT No.: PCT/AT2019/060178
§ 371 (c)(1),
(2) Date: Oct. 27, 2020

(87) PCT Pub. No.: WO2019/227116
PCT Pub. Date: Dec. 5, 2019

(65) Prior Publication Data
US 2021/0241938 A1 Aug. 5, 2021

(30) Foreign Application Priority Data

May 29, 2018 (AT) ............................... A50436/2018
Jan. 8, 2019 (AT) ............................... A50008/2019

(51) Int. Cl.
*H02K 3/34* (2006.01)
*H02K 3/24* (2006.01)
(Continued)

(52) U.S. Cl.
CPC .......... *H02K 3/345* (2013.01); *H01B 7/0275* (2013.01); *H02K 3/04* (2013.01); *H02K 3/24* (2013.01); *H02K 3/30* (2013.01); *H02K 3/32* (2013.01)

(58) Field of Classification Search
CPC .......... H01B 7/02; H01B 7/0275; H02K 3/04; H02K 3/30; H02K 3/32; H02K 3/24; H02K 3/34; H02K 3/345; H02K 2213/03
See application file for complete search history.

(56) References Cited

U.S. PATENT DOCUMENTS 5,925,467 A * 7/1999 Strumpler ................. H05F 1/00
                                                428/426
9,831,734 B2   11/2017 Sakaue et al.
(Continued)

FOREIGN PATENT DOCUMENTS

DE  11 2013 004 722 T5    6/2015
DE     102014003603 A1 *  9/2015 ............ B32B 27/32
(Continued)

OTHER PUBLICATIONS

International Search Report in PCT/AT2019/060178, dated Sep. 18, 2019.
(Continued)

*Primary Examiner* — Naishadh N Desai
(74) *Attorney, Agent, or Firm* — Collard & Roe, P.C.

(57) ABSTRACT

The invention relates to an electric conductor for use in electric machines, more particularly for producing windings for stators or rotors of electric machines, such as electric motors or generators. The conductor comprises an electrically conductive conductor core having a substantially rectangular cross-section and comprises two longitudinal end faces arranged opposite one another and two transverse end faces arranged opposite one another as well as a total longitudinal extension between a first end and a second end. The conductor further comprises at least one insulation layer, which is arranged around the full circumference of the conductor core at least over a predominant part of the total longitudinal extension of the conductor core. The at least one insulation layer predominantly consists of an extrud- (Continued)

Figure 3:
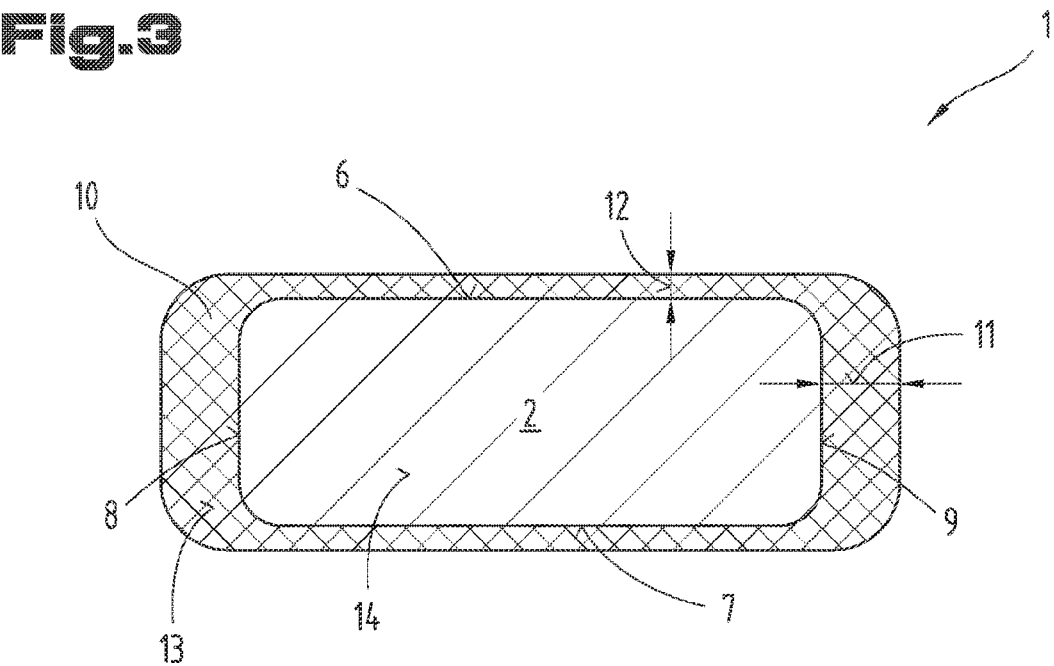

able, polymer, thermoplastic material selected from the group of aromatic polysulfones (PAES) or mixtures of aromatic polysulfones (PAES).

19 Claims, 4 Drawing Sheets

(51) Int. Cl.
*H02K 3/30* (2006.01)
*H01B 7/02* (2006.01)
*H02K 3/04* (2006.01)
*H02K 3/32* (2006.01)

(56) References Cited

U.S. PATENT DOCUMENTS

| | | | |
|---|---|---|---|
| 10,210,966 B2 | 2/2019 | Yamoto et al. | |
| 10,250,095 B2 | 4/2019 | Akashi et al. | |
| 10,319,491 B2 | 6/2019 | Fukuda et al. | |
| 2008/0128154 A1 | 6/2008 | Faust et al. | |
| 2010/0305265 A1* | 12/2010 | Vath | C08L 23/10 524/581 |
| 2013/0338318 A1* | 12/2013 | Sakai | B29C 39/006 525/439 |
| 2014/0354014 A1* | 12/2014 | Okuda | C08J 5/047 296/193.11 |
| 2015/0129277 A1* | 5/2015 | Siripurapu | H01B 7/02 174/103 |
| 2015/0243410 A1 | 8/2015 | Knerr et al. | |
| 2015/0340920 A1* | 11/2015 | Ikeda | H02K 3/40 310/45 |
| 2016/0086691 A1* | 3/2016 | Kaji | H01B 1/023 428/380 |
| 2016/0156241 A1 | 6/2016 | Gruebel et al. | |
| 2017/0004900 A1* | 1/2017 | Ishii | H01B 7/292 |
| 2017/0358382 A1* | 12/2017 | Yamoto | H01B 7/0009 |
| 2018/0301245 A1* | 10/2018 | Glew | G02B 6/4484 |
| 2019/0131037 A1* | 5/2019 | Hochstoger | H01B 13/003 |

FOREIGN PATENT DOCUMENTS

| | | | |
|---|---|---|---|
| DE | 10 2015 21 6840 A1 | 3/2017 | |
| EP | 3 043 355 A1 | 7/2016 | |
| EP | 3 118 858 A1 | 1/2017 | |
| EP | 3 226 258 A1 | 10/2017 | |
| EP | 3 239 989 A1 | 11/2017 | |
| EP | 3 267 563 A1 | 1/2018 | |
| JP | 2017-163666 A | 9/2017 | |
| JP | 2017163666 A * | 9/2017 | |
| WO | 2006/061360 A1 | 6/2006 | |
| WO | 2014/056547 A1 | 4/2014 | |
| WO | WO-2015186730 A1 * | 12/2015 | H01B 3/427 |

OTHER PUBLICATIONS

International Search Report in PCT/AT2019/060177, dated Sep. 10, 2019.

* cited by examiner

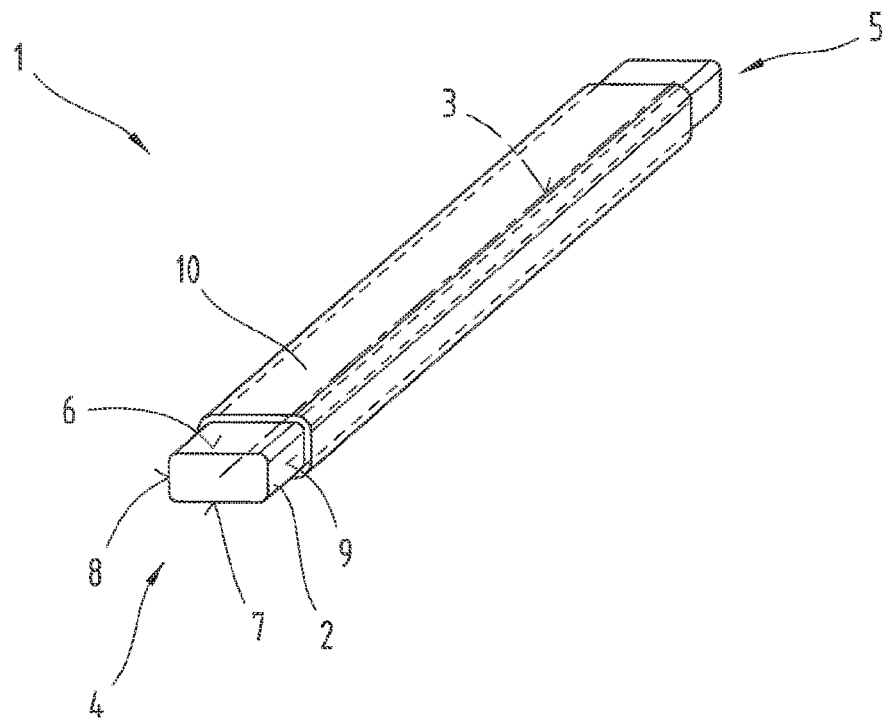
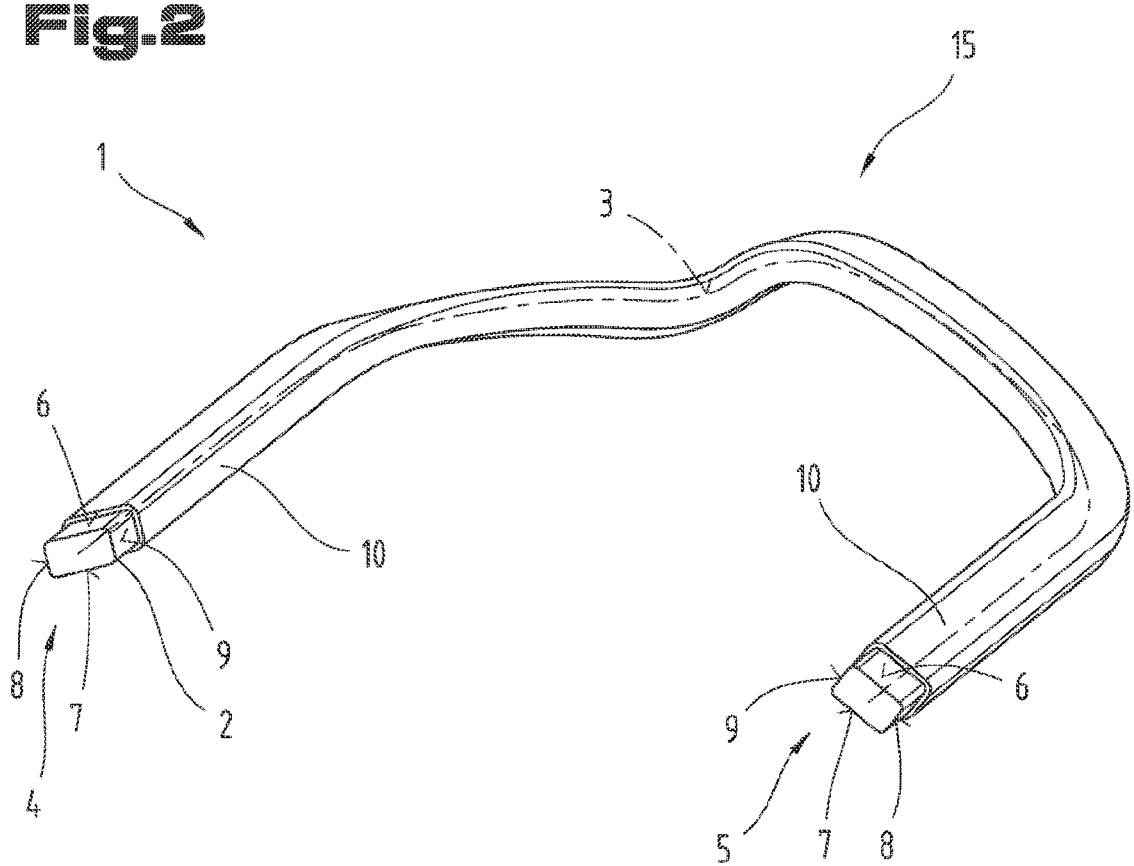

ELECTRIC CONDUCTOR FOR USE IN ELECTRIC MACHINES

CROSS REFERENCE TO RELATED APPLICATIONS

This application is the National Stage of PCT/AT2019/060178 filed on May 28, 2019, which claims priority under 35 U.S.C. § 119 of Austrian Application Nos. A50436/2018 filed on May 29, 2018 and A50008/2019 filed on Jan. 8, 2019, the disclosures of which are incorporated by reference. The international application under PCT article 21(2) was not published in English.

The invention relates to an electric conductor for use in electric machines, more particularly for producing windings for stators or rotors of electric machines, such as electric motors or generators.

Basically, electric machines with electric conductors are well known in the art. As notable examples, machines for producing, transforming or converting electric energy shall be mentioned at this point.

Depending on the purpose or construction of a particular electric machine, electric conductors for guiding electric current may be arranged in an electric machine in different ways. Electric conductors are often arranged in electric machines in the form of coils or windings, the latter, for example, in common stators or rotors of generators or electric motors.

During the operation of electric machines, high voltage is often induced, or electric machines are put under high voltage, and undesired electric contacts between electric conductors or between electric conductors and other components or, in particular, conductive components of an electric machine, such as a laminated core of a stator or rotor, may in principle develop during this process. To avoid this, electric conductors have to be electrically insulated or shielded as much as possible against each other and against other components of an electric machine. For this purpose, there are appropriate standards, such as EN 60664-1, which prescribe forming at least one absolutely flawless insulating layer or a double insulating layer.

Insulating electric conductors by means of a varnish layer deposited on the electric conductor and resin-impregnated insulation paper used to be a very common method of meeting the insulation requirements of electric conductors in electric machines. Depositing a varnish layer with a thickness of several 10 µm to several 100 µm on an electric conductor requires hardening, which is often carried out in a furnace and consumes a lot of time, energy and money. Likewise, introducing the resin-impregnated insulation paper and subsequently inserting the electric conductors, for example into the grooves of a stator or rotor of an electric machine, requires considerable technical effort.

An alternative is disclosed in DE102015216840A1. There, a stator for an electric machine having electric conductors is described, which are insulated against the laminated core by means of an insulation element. In this regard, the insulation element is formed from a thermoplastic tubular element, which surrounds or coats the respective electric conductor. Thus, instead of using insulation paper, each electric conductor has to be assembled with a dedicated tubular element before it is inserted into the electric machine, which requires significant processing efforts.

Another possibility for achieving sufficient insulation is disclosed in EP3043355 A1. Here, electric conductors having a multi-layer insulation layer are described, which comprises a thermosetting varnish containing urethane as a bonding layer to a thermoplastic resin deposited thereon. However, prior to further processing, the varnish layer must be hardened in a furnace before the second layer or top layer can be applied, which involves increased processing efforts.

US2015243410A1 describes the problem that an insulation layer on electric conductors of multiple thermosetting varnish layers may, as the number of varnish layers increases, lead to lowered adhesive force between the individual varnish layers and the formation of blisters. In US2015243410A1, it is proposed to build an insulation layer from multiple layers, with the outermost layer consisting of a thermoplastic resin and being bonded to the electric conductor by means of a thermosetting varnish layer. However, in this regard, the base varnish layer must be hardened as well, which in turn involves considerable processing efforts.

In addition, electric machines are usually expected to be compact and as powerful as possible at the same time. Moreover, the power or effectiveness of electric machines may strongly depend on the number of electric conductors used, or their packing density.

It has been the object of the present invention to overcome the still existing disadvantages of the prior art and to provide an electric conductor that combines sufficient insulation against other electric conductors and other, in particular conductive components of an electric machine with arranging the electric conductor in an electric machine in a most space-saving manner, and especially enables a high space factor of electric conductors in an electric machine. Another object of the present invention has been to provide an electrotechnical or electric winding consisting of one or multiple accordingly configured electric conductor(s) as well as a stator having one or multiple accordingly configured electric conductor(s).

On the one hand, the object of the invention is achieved by means of an electric conductor according to the claims.

The electric conductor according to the invention is adapted for use in electric machines, in particular for manufacturing windings for stators of electric machines, such as electric motors or generators.

The electric conductor comprises an electrically conductive conductor core having a substantially rectangular cross-section and a continuously closed conductor core cross-section. The conductor core comprises two longitudinal end faces arranged opposite one another and two transverse end faces arranged opposite one another as well as a total longitudinal extension between a first end and a second end of the conductor core. In this regard, the total longitudinal extension may be very short, depending on the application, for example if multiple electric conductors are welded into a winding; however, a conductor core may also have a large total longitudinal extension for further applications. Furthermore, the conductor core does not need to be straight along its total longitudinal extension, but the conductor core may, depending on the application, for example also have bends or sectional bends along its total longitudinal extension between the first and the second ends.

The electric conductor further comprises at least one insulation layer. Said insulation layer is, at least over a predominant part of the total longitudinal extension, arranged around the full circumference of the conductor core or entirely coats the conductor core in its cross-section.

The at least one insulation layer predominantly consists of an extrudable, polymer, thermoplastic material selected from the group of aromatic polysulfones (PAES) or mixtures of aromatic polysulfones (PAES). Here and in the following, in connection with the material the at least one insulation layer consists of, the term "predominantly" shall mean that the at least one insulation layer primarily or to a major part, for example at least 90 weight percent, preferably 95 weight percent or more, consists of one of the aforementioned polymer materials or mixtures thereof. To a smaller part, for example a maximum of 10 weight percent, preferably 5 weight percent or less, the insulation layer may also comprise other ingredients, such as additives that are commonly used in thermoplastic polymers. Moreover, it is self-evident that, for instance, also small amounts of manufacturing- and/or processing-related contaminations may be present in the insulation layer.

Electric conductors configured in such a way may advantageously be arranged in electric machines in a particularly space-saving manner, for example in grooves of a stator provided for receiving the electric conductors, and they still have a sufficient insulating effect against other electric conductors and/or other, in particular electrically conductive components of an electric machine, for example the groove walls of a stator. Basically, with electric conductors configured in this manner, the required insulating properties may already be achieved with only one insulation layer. In principle, the at least one insulation layer may be directly applied to the conductor core in this regard, with the insulation layer preferably being applied to the conductor core by means of extrusion, as will be explained in detail below. As stated above, the conductor core may have a substantially rectangular cross-section. In this regard, rounded edges are common and preferred in such conductor cores.

Moreover, it is advantageous that electric conductors configured in this manner may be comfortably and safely arranged or inserted into an electric machine, especially since no additional insulation element, such as insulation paper, has to be provided. Surprisingly, it has been shown that in the case of the aforementioned selection of polymer materials, the at least one insulation layer may be very slim, thus enabling a very high packing density of conductive conductor cores, which are usually formed from copper. It has been shown that this design criterion, which is also referred to as "copper space factor", allows increasing the effectiveness of an electric machine, for example a stator, without compromising the insulating properties. Moreover, protection against damage during insertion of the electric conductors into the laminated core or during any subsequent bending processes, for example for forming windings or coils, may be positively influenced.

In addition, in electric conductors with the aforementioned polymer materials for the at least one insulation layer, continuous operation of an electric machine is also possible at high temperatures, for example up to 170° C., preferably up to 180° C. and in particular up to 210° C. under usual operating voltages, for example 220 V to 1400 V, without compromising the electric insulating properties. All of this is possible despite the space-saving configuration enabling an arrangement of the electric conductors which is as dense and compact as possible.

In a preferred further development, it may be provided that the at least one insulation layer consists of a material having a relative permittivity of less than 4 at a frequency of 0.1 kHz to 100 kHz and a temperature of −50° C. to 180° C., measured according to IEC 60250.

This way, electric conductors having sufficient insulating properties along with very low space requirements may be provided as the at least one insulation layer may be particularly slim. In other words: the at least one insulation layer may be applied to the conductor core with relatively small thickness without having to tolerate compromising of the insulating properties. The relative permittivity is often also referred to as dielectric constant.

However, it may also be advantageous if the material of which the at least one insulation layer consists has a glass transition temperature above 160° C., preferably above 170° C., in particular above 180° C.

This way, a material may be selected for the at least one insulation layer which, on the one hand, retains its shape up to high temperatures under the operating conditions of an electric machine and may simultaneously be made shapeable without high energy consumption. This for example serves the purpose of applying it to the conductor core or for forming the electric conductor after applying the at least one insulation layer, for example by bending.

It may further be provided that the at least one insulation layer consists of a material having a heat deflection temperature according to ISO 75-1, -2, -3, method A of at least 170° C.

Due to this embodiment, an insulation layer with sufficient insulating properties may be provided, which simultaneously allows using the electric conductors at high operating temperatures. Preferably, the insulation layer may consist of a material having a heat deflection temperature according to ISO 75-1, -2, -3, method A of at least 180° C. The heat resistance according to ISO-1, -2, -3 is also referred to as HDT value (heat deflection temperature or heat distortion temperature); in the particular case, the heat deflection temperature may also be referred to as HDT A value (method A; loading of the specimen with 1.8 N/mm$^2$).

An embodiment may also be advantageous where the at least one insulation layer has a dielectric strength according to IEC 60243-1 of at least 28 kV/mm at a layer thickness of less than 500 μm.

This way, electric conductors may be provided by means of which during the operation of an electric machine in particular undesired voltage breakdowns, such as electric arcs or sparks, or short circuits between individual electric conductors and/or between electric conductors and other components of electric machines during the operation of the electric machines, i.e. when the conductor cores are subject to electric voltage or electric current, may be prevented.

In a preferred embodiment, the at least one insulation layer of the electric conductor may predominantly consist of polysulfone (PSU), polyethersulfone (PES or PESU) or polyphenylene sulfone (PPSU), or of mixtures of these aromatic polysulfones (PAES).

Thus, the at least one insulation layer may predominantly consist of polysulfone (PSU) with the base structure

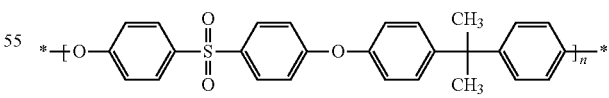

or polyethersulfone (PES or PESU) with the base structure

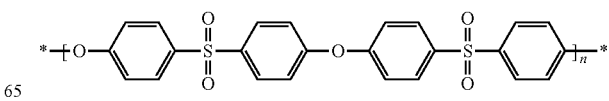

or polyphenylene sulfone (PPSU) with the base structure

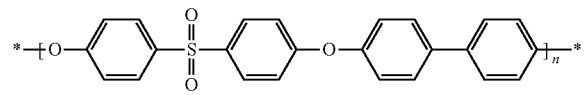

or of mixtures of these aromatic polysulfones (PAES) with the indicated base structures. Electric conductors with such insulation layers enable a particularly slim configuration of the insulation layers with a very small layer thickness and nevertheless sufficient insulating properties. A particularly space-saving arrangement of electric conductors configured in this manner may thus be provided in electric machines.

Furthermore, in the area of the transverse end faces, the at least one insulation layer may have a layer thickness which is 2 to 8 times a layer thickness of the at least one insulation layer in the area of the longitudinal end faces.

This embodiment of the at least one insulation layer especially offers advantages when multiple electric conductors are arranged directly adjacently, for example in a receiving groove for multiple electric conductors in a laminated core of a stator of an electric machine. It has namely surprisingly been shown that an insulation between adjacent electric conductors, i.e. a respective insulation at the longitudinal end faces of the conductor core, may be comparatively slim, so that high packing density of the electric conductors, for example in receiving grooves of a laminated core of a stator, may be achieved. This way, the effectiveness of an electric machine, such as a stator, may ultimately be further increased. In a typical electric conductor for an electric machine, such as a stator, a layer thickness of the at least one insulation layer may, for example, be 10 μm to 100 μm in the area of the longitudinal end faces; accordingly, a layer thickness of the at least one insulation layer may, for example, be 50 μm to 500 μm in the area of the transverse end faces.

It may further be provided that the at least one insulation layer has a total cross-sectional area which is 0.1 to 0.18 times a total cross-sectional area of the conductor core.

Also in this regard, it has been surprisingly shown that with such a relatively small total cross-sectional area of the at least one insulation layer, a sufficient insulating effect may nevertheless be achieved during the operation of electric machines. Thus, the amount of actually electrically conductive material in the form of the conductor core, for example made of copper, may be increased in relation to the at least one insulation layer, which has no effect in this respect, and a more efficient electric machine with a further improved metal or copper space factor may thus be provided. A total cross-sectional area of a typical, substantially rectangular conductor core for electric machines may, for example, be 4 mm² to 10 mm². Accordingly, a total cross-sectional area of the at least one insulation layer may, for example, be 0.6 mm² to 1.5 mm².

In a particularly preferred embodiment of the electric conductor, it may be provided that the at least one insulation layer is applied to the conductor core by means of extrusion.

This way, on the one hand, sufficient adhesion of the at least one insulation layer on the conductor core, which is usually made of copper, may be realized. Moreover, as has become apparent, the occurrence of voids is highly improbable in insulation layers that have been extruded onto the conductor core. Compared to the use of insulation varnishes or insulation paper, this is advantageous with regard to operational safety, and the manufacturing costs may thus also be reduced. Extruded polymers often have characteristic surface features or structures, which are naturally visible as a kind of "extrusion marks" in the extrusion direction, and they are thus clearly distinguishable from a conventionally-applied varnish layer.

In another embodiment of the electric conductor, it may be appropriate that the at least one insulation layer is completely coated with a support layer, i.e. that said support layer entirely surrounds the at least one insulation layer in its cross-section. In this regard, the support layer may, at all locations where the at least one insulation layer is applied to the conductor core, be applied to the at least one insulation layer so as to entirely coat said layer.

Such a support layer may in particular be formed by a high-temperature stable polymer material, and improved stability of the at least one insulation layer may thus be achieved even under continuously high operating temperatures of an electric machine. Such a support layer may also be configured as an electric insulation layer or consist of an electrically insulating material; this way, a further increased insulating effect may be provided. In addition, any voids in the underlying, at least one insulation layer may be levelled out by applying such a support layer, thus enabling further improved operational safety.

In this regard, the support layer of the electric conductor may preferably consist of an extrudable, polymer, thermoplastic material selected from the group of aromatic polysulfones (PAES) or polyaryletherketones (PAEK) or of mixtures of these materials.

The aforementioned materials have proven to be well suited for a support layer as they have a combination of favorable properties such as form stability also under high temperatures and a good insulating effect also with small layer thicknesses.

Particularly preferably, the support layer may predominantly consist of polysulfone (PSU), polyethersulfone (PES or PESU), polyphenylene sulfone (PPSU) or polyaryletherketone (PAEK) or of mixtures of these thermoplastic polymers.

In other words: the insulating layer may predominantly consist of polysulfone (PSU) with the base structure

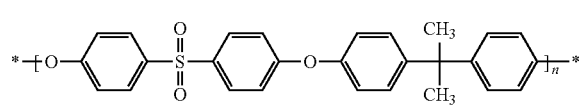

or of polyethersulfone (PES or PESU) with the base structure

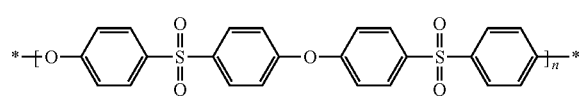

or of polyphenylene sulfone (PPSU) with the base structure

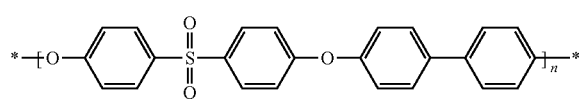

or of polyaryletherketone (PAEK) consisting of the base blocks

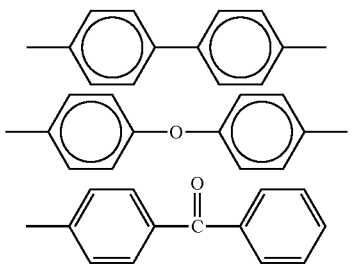

or of mixtures of these polymer materials with the base structures indicated above.

The materials indicated above have proven to be particularly suited for forming a support layer as they result in good properties with regard to stability and an additional electric insulation effect, even if the support layer configured in this way has a very small layer thickness. In this regard, the support layer may thus also have the effect of an additional electric insulation layer.

A specific layer structure may basically be varied depending on the requirement profile of an electric machine, for example depending on the intended working or operating temperature.

For example, a conductor core of an electric conductor intended for continuous operating temperatures of up to 180° C. may be coated with an insulation layer predominantly consisting of polysulfone (PSU), or the at least one insulation layer in such an electric conductor may consist of polysulfone (PSU). The support layer of such an electric conductor may, for example, predominantly consist of polysulfone (PSU), polyethersulfone (PES or PESU) or polyphenylene sulfone (PPSU).

A conductor core of an electric conductor intended for continuous operating temperatures of up to 200° C. may, for example, be coated with an insulation layer predominantly consisting of polyethersulfone (PES or PESU) or polyphenylene sulfone (PPSU), or the at least one insulation layer of such an electric conductor may consist of polyethersulfone (PES or PESU) or polyphenylene sulfone (PPSU). The support layer of such an electric conductor may predominantly also consist of polyethersulfone (PES or PESU) or polyphenylene sulfone (PPSU), wherein, if the insulation layer predominantly consists of polyphenylene sulfone (PPSU), the support layer preferably predominantly consists of polyethersulfone (PES or PESU).

A conductor core of an electric conductor intended for continuous operating temperatures of up to 220° C. may preferably be coated with an insulation layer predominantly consisting of polyethersulfone (PES or PESU), or the at least one insulation layer of such an electric conductor may consist of polyethersulfone (PES or PESU). The support layer of such an electric conductor may preferably predominantly consist of polyaryletherketone (PAEK).

Moreover, an embodiment of the electric conductor may be particularly advantageous where the support layer consists of a material having an elongation at break according to ISO 527-1, -2 of 50% or more.

By configuring the support layer in such a way, particularly high operational safety may be provided for an electric machine as the risk of damage to the support layer and in particular to the underlying, at least one insulation layer may be minimized to the greatest possible extent. Preferably, the elongation at break according to ISO 527-1, -2 of the support layer may be 55% or more, in particular 60% or more.

It may further be advantageous if the support layer consists of a material having a heat deflection temperature according to ISO 75-1, -2, -3, method A of at least 170° C.

With this configuration, an electric conductor may be provided which offers particularly high operational safety in the operation of electric machines even under continuously high operating temperatures. Preferably, the support layer may consist of a material having a heat deflection temperature according to ISO 75-1, -2, -3, method A of at least 180° C. The heat resistance according to ISO-1, -2, -3 is also referred to as HDT value (heat deflection temperature or heat distortion temperature); in the particular case, the heat deflection temperature may also be referred to as HDT A value (method A; loading of the specimen with 1.8 N/mm²).

A layer thickness of the support layer may be substantially uniform around the circumference of the at least one insulation layer and may be 0.6 to 1.0 times a layer thickness of the at least one insulation layer in the area of the longitudinal end faces.

Surprisingly, it has been shown that already at such small layer thicknesses of the support layer, improvements during the operation of an electric machine may be provided. In particular, the at least one insulation layer arranged under the support layer may be sufficiently stabilized despite the small layer thickness of the coating support layer, also during continuous operation of an electric machine. A layer thickness of the at least one insulation layer in the area of the longitudinal end faces may, for example, be 10 µm to 100 µm. Accordingly, a substantially uniform layer thickness of the support layer around the at least one insulation layer may, for example, be 6 µm to 100 µm.

In addition, it may be provided that the support layer has a total cross-sectional area which is 0.22 to 0.35 times a total cross-sectional area of the at least one insulation layer.

This way, an electric conductor may be provided which, on the one hand, may be arranged in an electric machine in a very space-saving manner and enables a high space factor of electrically conductive material, and still enables sufficient stability for the operation of an electric machine.

Advantageously, it may further be provided that the support layer is applied to the at least one insulation layer by means of extrusion.

This way, good adhesion of the support layer to the at least one insulation layer may in turn be achieved, and the risk of voids may be minimized to the greatest possible extent. Extruded polymers often have characteristic surface features or structures, which are naturally visible as a kind of "extrusion marks" in the extrusion direction, and they are thus clearly distinguishable from a conventionally-applied varnish layer. The support layer may, for example, be applied by means of a separate extrusion step to the at least one insulation layer which has already been applied or extruded onto the conductor core. Alternatively, however, it is also possible to provide or coat the conductor core with the at least one insulation layer and the support layer by means of co-extrusion, so that the at least one insulation layer and the support layer are applied to the conductor core in one joint extrusion step.

However, the object of the invention is also achieved with an electric winding for an electric machine, in particular a stator of a generator or electric motor. In this regard, the winding is manufactured from one or multiple interconnected electric conductor(s) described above.

For example, the electric or electrotechnical winding may be manufactured by welding the ends of multiple, suitably formed electric conductors, or the winding may be manufactured from one continuous electric conductor that has been brought into a suitable shape. The advantages of electric conductors configured in the manner described above has already been explained based on the configuration of the electric conductors, and reference is made to the corresponding passages in the description for describing the advantages.

Finally, the object of the invention is also achieved with a stator for an electric machine, such as a generator or electric motor. In this regard, the stator comprises a laminated core having multiple grooves continuously extending in the circumferential direction around a longitudinal axis of the laminated core and in a longitudinal direction of the laminated core, with at least two electric conductors being received in each groove for forming an electric winding.

In in this regard, it is essential that the electric conductors received in the grooves are configured in the manner already described above. From this, advantages in turn result which have already been explained based on the configuration of the electric conductors, and reference is made to the corresponding passages of this description in this respect.

In particular, it may be provided in this regard that the respective electric conductors received in said grooves are entirely coated with the at least one insulation layer at least over a total longitudinal extension of a respective groove.

This way, sufficient insulation against the laminated core of a stator, in which laminated core said receiving grooves are usually formed, may be achieved especially in areas within a groove that are particularly critical with regard to insulation. In the areas outside the grooves, the electric conductor may also be uninsulated, especially if there is no contact or no direct vicinity to other components of the stator here. In particular, at locations which are intended for creating a connection with further electric conductors, for example by means of welding, the electric conductor may not have an insulation, or the at least one insulation layer and, if applicable, the support layer may be removed from the conductor core at such locations.

For better understanding of the invention, the latter is explained in detail with reference to the following figures.

Figure 4:
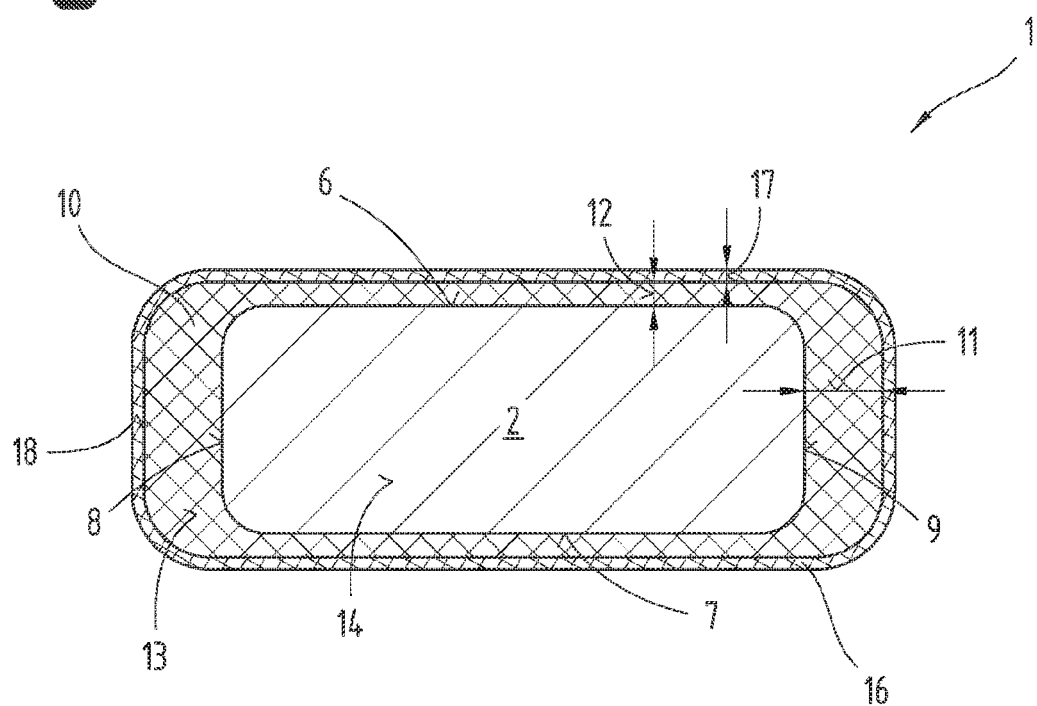
Figure 5:
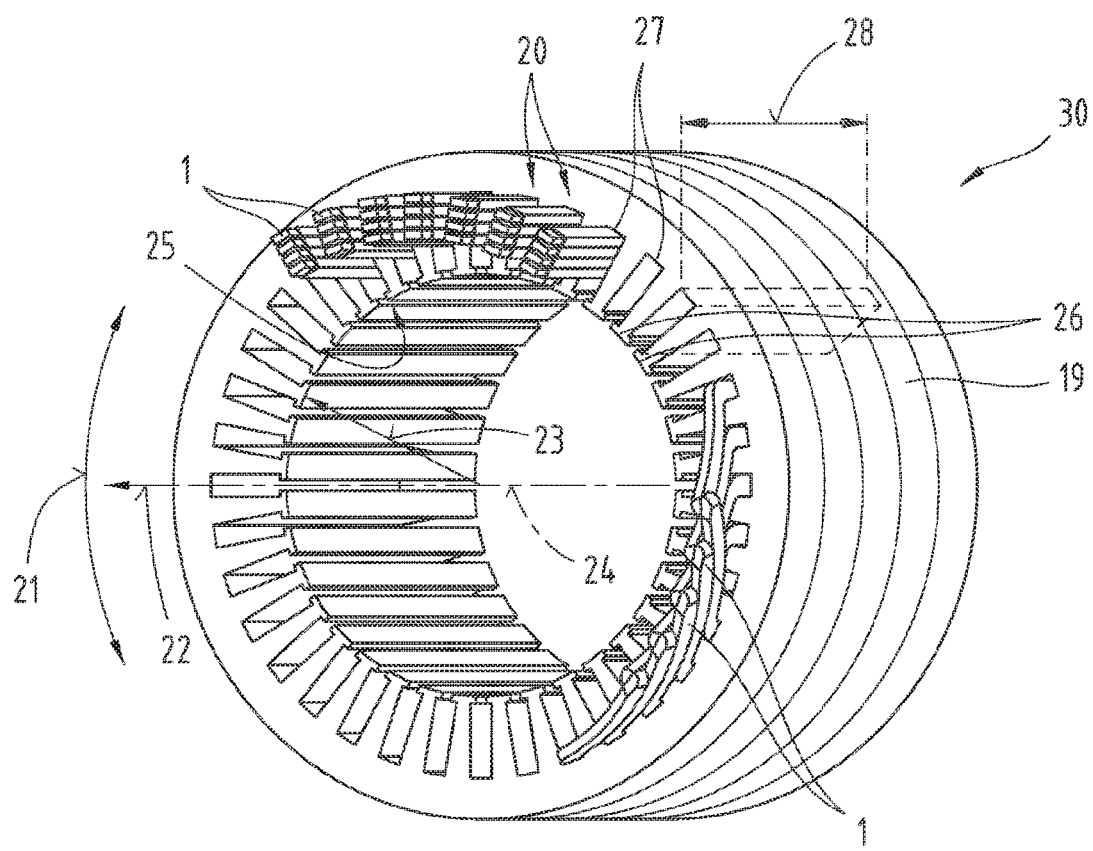
Figure 6:
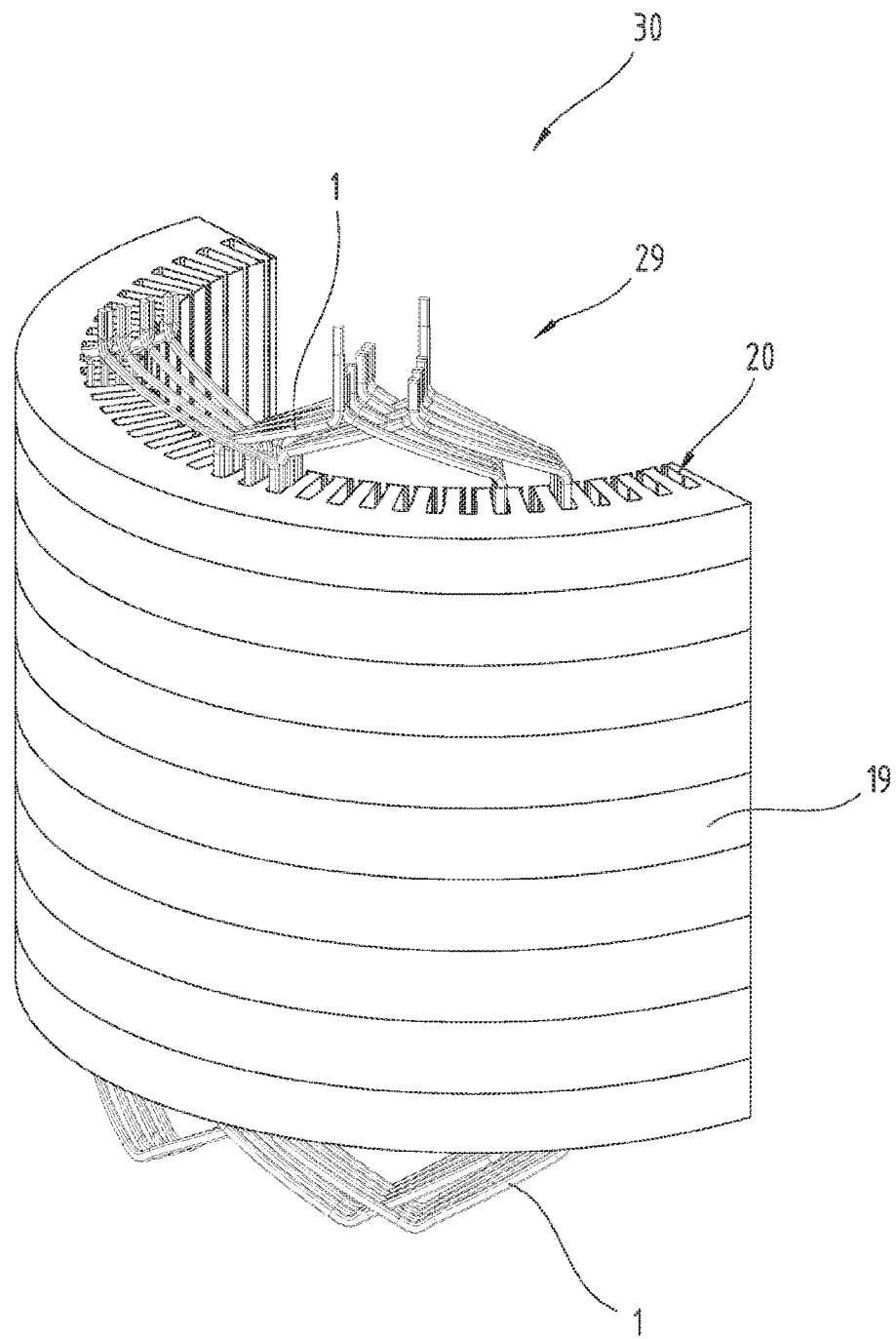

The following is shown in highly simplified, schematic representation:

FIG. 1 a perspective view of a first exemplary embodiment of an electric conductor;

FIG. 2 a perspective view of a second exemplary embodiment of an electric conductor;

FIG. 3 a sectional view of an embodiment of an electric conductor;

FIG. 4 another sectional view of an embodiment of an electric conductor;

FIG. 5 an embodiment of a stator of an electric motor with electric conductors;

FIG. 6 an embodiment of an electric or electrotechnical winding arranged in a stator of an electric machine.

First of all, it should be noted that in the embodiments described in different ways, identical parts are given identical reference numbers or identical component names, and the disclosures contained in the entire description may be correspondingly applied to identical parts with identical reference numbers or identical component names. Moreover, the position indications used in the description, such as at the top, at the bottom, lateral, etc. directly refer to the figure shown and described, and, if a position changes, said position indications are to be correspondingly applied to the new position.

FIG. 1 and FIG. 2 show, merely by way of example, two typical geometrical embodiments of electric conductors 1 for use in electric machines, more particularly for producing windings for stators or rotors of electric machines, such as electric motors or generators. The electric conductor 1 shown in FIG. 1 comprises a conductor core 2 having a total longitudinal extension 3 between a first end 4 and a second end 5. The embodiment shown in FIG. 1 comprises a conductor core 2 having a total longitudinal extension 3 with a substantially straight course, whereas the electric conductor 1 shown in FIG. 2 has a total longitudinal extension 2 between a first end 4 and a second end 5 with a bent, in particular a U- or V-shaped course. Such electric conductors are also referred to as "hair pins" in technical jargon. The total longitudinal extension 3 of the bent or U-shaped conductor core 2 shown in FIG. 2 would correspond to a total length of the conductor core 2 in a hypothetical, extended state of the electric conductor 1 shown in FIG. 2. A total longitudinal extension 3 of a conductor core 2 specifically means a longitudinal extension along a neutral fiber of the conductor core 2. A conductor core 2 of an electric conductor 1 for electric machines is usually made from copper due to the high conductivity required.

The electric conductors 1 shown in FIG. 1 and FIG. 2 may typically be provided for being received in grooves of a laminated core and for forming a winding, as will be explained in more detail below based on FIG. 5 and FIG. 6. Of course, electric conductors 1 having a different geometrical configuration than the embodiments shown in FIG. 1 and FIG. 2 are possible as well, and electric conductors having a different configuration are quite common. In this regard, a respective specific embodiment depends on the respective requirement profile of an electric conductor 1, i.e. primarily on the required or intended arrangement of the electric conductor 1 in an electric machine.

As can be seen in FIG. 1 and FIG. 2, the electric conductor 1 comprises, regardless of its geometrical configuration, an electrically conductive conductor core 2 having a substantially rectangular cross-section, wherein said conductor core cross-section is continuously closed within itself. As can best be seen from the sectional view of an electric conductor 1 shown in FIG. 3, the electrically conductive conductor core 2 comprises two longitudinal end faces 6, 7 arranged opposite one another and two transverse end faces 8, 9 arranged opposite one another. As is also shown in FIG. 3, the conductor core 2, which is substantially rectangular, may comprise slightly rounded edges, which has proven to be useful in practice. In the technical area of electric machines, such a cross-section shape of the conductor 2 with rounded edges is quite common, and conductor cores 2 with such a cross-section are comparatively resistant against damage, and they may also be relatively unproblematically introduced into grooves of a laminated core of a stator. Furthermore, any coatings on conductor cores 2 configured in this manner are relatively resistant against damage as increased abrasion at sharp edges may be prevented.

As can best be seen from the sectional view in FIG. 3, the electric conductor 1 further comprises at least one insulation layer 10, which is arranged around the full circumference of the conductor core 2, i.e. which—viewed in cross-section—thus entirely coats or surrounds the conductor core 2. In this regard, this at least one insulation layer 10 is arranged around the full circumference of the conductor core 2 at least over a predominant part of the total longitudinal extension 3 of the conductor core 2, as schematically shown in FIG. 1 and FIG. 2. In this regard, at least the parts of the total longitudinal extension 3 of the conductor core 2 which are arranged in the electric machine such that they are in contact with or directly adjacent to other electric conductors or other, in particular electrically conductive components of the electric machine, are provided with the at least one insulation layer 10. In the parts of the total longitudinal extension 3 of the conductor core 2 which are not directly adjacent to other electric conductors and/or other components of the electric machine, the conductor 1 may not have an insulation layer, or the at least one insulation layer 10 may be superfluous or removed at such locations. In particular, at locations which are intended for creating a connection with further electric conductors, for example by means of welding, the electric conductor 1 may not have an insulation, or the at least one insulation layer 10 may be removed from the conductor core 2 or superfluous at such locations, as indicated in FIG. 1 and FIG. 2.

It is essential that the at least one insulation layer 10 predominantly consists of an extrudable, polymer, thermoplastic material selected from the group of aromatic polysulfones (PAES) or mixtures of aromatic polysulfones (PAES). In connection with the material the at least one insulation layer consists of, the term "predominantly" shall mean that the at least one insulation layer primarily or to a major part, for example at least 90 weight percent, preferably 95 weight percent or more, consists of one of the aforementioned polymer materials or mixtures thereof. To a smaller part, for example a maximum of 10 weight percent, preferably 5 weight percent or less, the insulation layer may also comprise other ingredients, such as additives that are commonly used in thermoplastic polymers. Moreover, it is self-evident that, for instance, also small amounts of manufacturing- and/or processing-related contaminations may be present in the insulation layer.

The at least one insulation layer 10 of the electric conductor 1, which layer is shown in FIG. 1 to FIG. 3 and consists of aromatic polysulfone (PAES) or a mixture of aromatic polysulfones (PAES), may in particular consist of a material having a relative permittivity of less than 4 at a frequency of 0.1 kHz to 100 kHz and a temperature of −50° C. to 180° C., measured according to IEC 60250. The relative permittivity is often also referred to as dielectric constant or permittivity constant and represents the dimensionless ratio of the permittivity ε of a medium or material to the permittivity $\varepsilon_0$ of the vacuum.

Moreover, the material the at least one insulation layer 10 consists of may have a glass transition temperature above 160° C., preferably above 170° C., in particular above 180° C. This way, softening of the at least one insulation layer 10 may be prevented even under high working or operating temperatures of an electric machine, wherein, in particular, the at least one insulation layer 10 may nevertheless be applied to the conductor core 2 by means of a thermoplastic process, such as extrusion.

In addition, the at least one insulation layer 10 may consist of a material having a heat deflection temperature according to ISO 75-1, -2, -3, method A of at least 170° C. Preferably, the insulation layer may consist of a material having a heat deflection temperature according to ISO 75-1, -2, -3, method A of at least 180° C. The heat resistance according to ISO-1, -2, -3 is also referred to as HDT value (heat deflection temperature or heat distortion temperature); in the particular case, the heat deflection temperature may also be referred to as HDT A value (method A; loading of the specimen with 1.8 N/mm$^2$).

To achieve sufficient insulation, the at least one insulation layer 10 may further have a dielectric strength according to IEC 60243-1 of at least 28 kV/mm at a layer thickness of less than 500 μm. This way, in particular undesired voltage breakdowns, such as electric arcs or sparks, may be prevented in electric machines.

The at least one insulation layer of the electric conductor may predominantly consist of polysulfone (PSU), polyethersulfone (PES or PESU) or polyphenylene sulfone (PPSU), or of mixtures of these aromatic polysulfones (PAES).

The at least one insulation layer 10 may thus predominantly consist of polysulfone (PSU) with the base structure

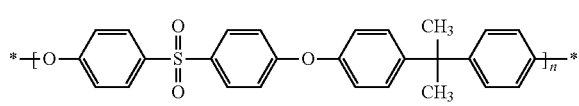

or of polyethersulfone (PES or PESU) with the base structure

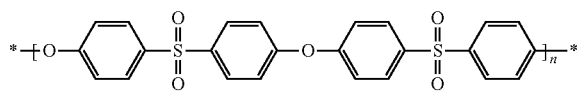

or of polyphenylene sulfone (PPSU) with the base structure

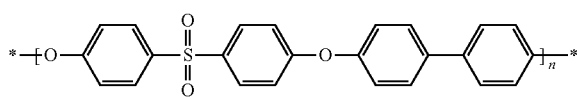

or of mixtures of these aromatic polysulfones with the base structures indicated above.

As shown in FIG. 3, the at least one insulation layer 10 may, in the area of the transverse end faces 8, 9, have a layer thickness 11 which is 2 to 8 times a layer thickness 12 of the at least one insulation layer 10 in the area of the longitudinal end faces 6, 7. A layer thickness 12 of the at least one insulation layer 10 may, for example, be 10 μm to 100 μm in the area of the longitudinal end faces 6, 7. A layer thickness 11 of the at least one insulation layer 10 may, for example, be 50 μm to 500 μm in the area of the transverse end faces 8, 9. It has namely been shown that an insulation between adjacent electric conductors 1, i.e. a respective insulation at the longitudinal end faces 6, 7 of the conductor core 2, may be comparatively slim. This embodiment of the electric conductor 1 is particularly adapted for being arranged in an electric machine where electric conductors 1 are arranged directly adjacently, for example in grooves configured for receiving multiple electric conductors in a laminated core of a stator. Such an embodiment of a component of an electric machine is described in more detail below based on FIG. 5 and FIG. 6.

As is further shown in FIG. 3, the at least one insulation layer 10 may have a total cross-sectional area 13 which is 0.1 to 0.18 times a total cross-sectional area 14 of the conductor core 2. A total cross-sectional area 13 of a the substantially rectangular conductor core 2 for electric machines may, for example, be 4 mm$^2$ to 10 mm$^2$; a total cross-sectional area 14 of the at least one insulation layer 10 may, for example, be 0.6 mm$^2$ to 1.5 mm$^2$.

Particularly preferred is an embodiment of the electric conductor 1 where the at least one insulation layer 10 is applied to the conductor core 2 by means of extrusion. In this regard, the at least one insulation layer 10 may be applied to a conductor core strand which was, for example, unrolled from a roller, for example by means of continuous extrusion. Such a conductor core 2 for applying the at least one insulation layer 10 may thus be present in the form of a so-called "continuous strand". After the at least one insulation layer 10 has cooled off after extrusion, a conductor core strand coated in this manner may occasionally and where required be formed into individual electric conductors 1 having a respectively desired total longitudinal extension 3 between a first end 4 and a second end 5, as in the case of the U- or V-shaped electric conductor 1 shown in FIG. 2, for instance. In addition, in the course of further processing of the electric conductor 1, the at least one insulation layer 10 may be removed from the conductor core 2 at certain locations on the electric conductor 1, for example at locations which are intended for creating a connection with other electric conductors 1. Such locations are often the ends 4, 5 of the conductor core 2; however, for example in conductor 1 shown in FIG. 2, the conductor core 2 may also be blank or without an insulation in the area of the U- or V-shaped bend. An extruded insulation layer 10 may have characteristic surface features or structures, which are naturally visible as a kind of "extrusion marks" in the extrusion direction.

In FIG. 4, another, possibly independent embodiment of the electric conductor 1 is shown, wherein identical reference numbers or component names as in preceding FIGS. 1-3 are used for identical parts. To avoid unnecessary repetition, reference is made to the detailed description in preceding FIGS. 1-3.

In the embodiment of an electric conductor 1 shown in FIG. 4, the at least one insulation layer 10 is additionally completely coated with a support layer 16. As can be seen in FIG. 4, such a support layer 16 may entirely surround the at least one insulation layer 10 in its cross-section. In this regard, said support layer 16 may, at all locations along the total longitudinal extension 3 where the at least one insulation layer 10 is applied to the conductor core 2, be applied to the at least one insulation layer 10 so as to entirely coat said layer. Said support layer 16 may preferably consist of high-temperature stable polymer material and may hereby in particular serve as a further insulation layer in addition to the at least one insulation layer 10. In addition, any voids in the underlying, at least one insulation layer 10 may be levelled out by applying such a support layer 16.

The support layer preferably predominantly consists of an extrudable, polymer, thermoplastic material selected from the group of aromatic polysulfones (PAES) or polyaryletherketone (PAEK) or of mixtures of these materials. Particularly preferably, the support layer 16 may predominantly consist of polysulfone (PSU), polyethersulfone (PES or PESU), polyphenylene sulfone (PPSU) or polyaryletherketone (PAEK) or of mixtures of these thermoplastic polymers.

The support layer 16 may thus predominantly consist of polysulfone (PSU) with the base structure

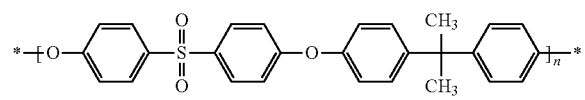

or of polyethersulfone (PES or PESU) with the base structure

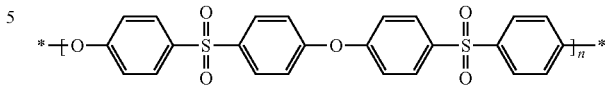

or of polyphenylene sulfone (PPSU) with the base structure

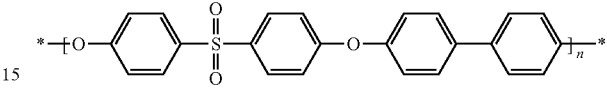

or of polyaryletherketone (PAEK) consisting of the base blocks

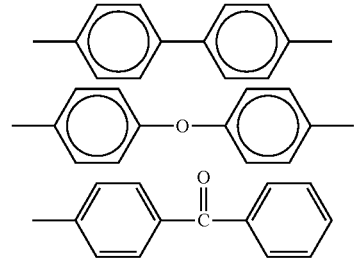

or of mixtures of these polymer materials with the base structures indicated above.

A specific layer structure may basically be varied depending on the requirement profile of an electric machine, for example depending on the intended working or operating temperature.

For example, a conductor core 2 of an electric conductor intended for continuous operating temperatures of up to 180° C. may be coated with an insulation layer 10 predominantly consisting of polysulfone (PSU), or the at least one insulation layer of such an electric conductor 1 may consist of polysulfone (PSU). The support layer 16 of such an electric conductor 1 may, for example, predominantly consist of polysulfone (PSU), polyethersulfone (PES or PESU) or polyphenylene sulfone (PPSU).

A conductor core 2 of an electric conductor 1 intended for continuous operating temperatures of up to 200° C. may, for example, be coated with an insulation layer 10 predominantly consisting of polyethersulfone (PES or PESU) or polyphenylene sulfone (PPSU), or the at least one insulation layer 10 of such an electric conductor may consist of polyethersulfone (PES or PESU) or polyphenylene sulfone (PPSU). The support layer 16 of such an electric conductor 1 may predominantly also consist of polyethersulfone (PES or PESU) or polyphenylene sulfone (PPSU), wherein, if the insulation layer 10 predominantly consists of polyphenylene sulfone (PPSU), the support layer 16 preferably predominantly consists of polyethersulfone (PES or PESU).

A conductor core 2 of an electric conductor 1 intended for continuous operating temperatures of up to 220° C. may preferably be coated with an insulation layer 10 predominantly consisting of polyethersulfone (PES or PESU), or the at least one insulation layer 10 of such an electric conductor may consist of polyethersulfone (PES or PESU). The support layer 16 of such an electric conductor 1 may preferably predominantly consist of polyaryletherketone (PAEK).

An embodiment of the electric conductor 1 has proven to be particularly suitable wherein the support layer 16 consists of a material having an elongation at break according to ISO 527-1, -2 of 50% or more. This way, especially the risk of damage to the support layer 16 and the underlying, at least one insulation layer 10 may be minimized to the greatest possible extent. Preferably, the support layer 16 may have an elongation at break according to ISO 527-1, -2 of 55% or more, in particular 60% or more.

However, it may also be appropriate if the support layer 16 consists of a material having a heat deflection temperature according to ISO 75-1, -2, -3, method A of at least 170° C. Preferably, the support layer may consist of a material having a heat deflection temperature according to ISO 75-1, -2, -3, method A of at least 180° C. The heat resistance according to ISO-1, 2, -3 is also referred to as HDT value (heat deflection temperature or heat distortion temperature); in the particular case, the heat deflection temperature may also be referred to as HDT A value (method A; loading of the specimen with 1.8 N/mm$^2$).

As can be seen in FIG. 4, a layer thickness 17 of the support layer 16 may be substantially uniform around the circumference of the at least one insulation layer 10. Furthermore, the layer thickness 17 of the support layer 16 may be 0.6 to 1.0 times a layer thickness 12 of the at least one insulation layer 10 in the area of the longitudinal end faces 6. A layer thickness 13 of the at least one insulation layer 10 may, for example, be 10 µm to 100 µm in the area of the longitudinal end faces 6, 7. A substantially uniform layer thickness 17 of the support layer 16 may, for example, be 6 µm to 100 µm. In addition, the support layer 16 may have a total cross-sectional area 18 which is 0.22 to 0.35 times a total cross-sectional area 13 of the at least one insulation layer 10.

Preferably, the support layer 16 is also applied to the at least one insulation layer 10 by means of extrusion. The support layer 16 may, for example, be applied by means of a separate extrusion step to the at least one insulation layer 10 which has already been applied or extruded onto the conductor core 2. Alternatively, however, it is also possible to provide or coat the conductor core 2 with the at least one insulation layer 10 and the support layer 16 by means of co-extrusion, so that the at least one insulation layer 10 and the support layer 16 are applied to the conductor core 2 in one joint extrusion step. In this regard, extruded polymers often have characteristic surface features or structures, which are naturally visible as a kind of "extrusion marks" in the extrusion direction.

In FIG. 5, an embodiment of an arrangement of the electric conductors 1 in an electric machine is shown. A stator 30 for an electric machine, such as a generator or electric motor, is shown in oblique view. In this regard, the stator 30 comprises a laminated core 19 in which a plurality of grooves 20 are distributed in the circumferential direction 21 around a longitudinal axis 24 of the laminated core 19. In this regard, the grooves 20 are configured in a continuous manner in the longitudinal direction 22. In FIG. 5, multiple electric conductors 1 prior to being connected into an electric or electrotechnical winding are shown by way of example. As can be seen, conductors 1 configured according to FIG. 1 are arranged in the example shown in FIG. 5. FIG. 5 further shows by way of example that multiple electric conductors 1 may be bent in the circumferential direction 21 for forming a coil or winding, and electric conductors 1 corresponding to each other may be present in interconnected form. In this regard, it is provided that at least two electric conductors 1 are received in a groove 20 for forming an electric winding.

The grooves 20 of the laminated core 19 may be open in the radial direction 23 of a longitudinal axis 24 of the stator 30. Such openings may be configured as an air gap 25. The areas of the laminated core 19 which delimit the grooves 20 in the direction of the longitudinal axis 24 may be configured as a tooth tip 26 in the circumferential direction 21. At the opposite side of the respective groove 20, the groove base 27 is located. The exact number of grooves 20 and the shape and number of the electric conductors 1 received therein depend on the desired size and the design of the electric machine.

Basically, the grooves 20 may have different cross-section shapes; in this respect, corresponding, rectangular cross-sections of the grooves 20 have proven to work well for receiving electric conductors 1. For insulating the individual electric conductors 1 against each other and against the laminated core 19, the at least one insulation layer 10 has to be configured flawlessly in the circumferential direction 21 and in the radial direction 23 in a continuously closed manner in order to coat the electric conductors 1 at least within the laminated core 19.

In this regard, it is essential that the electric conductors 1 received in the grooves 20 are configured according to the embodiments described above based on FIGS. 1-4. It may further be provided that the respective electric conductors 1 received in said grooves 20 are entirely coated with the at least one insulation layer 10 and, if applicable, also with the support layer 16 at least over a total longitudinal extension 28 of a respective groove 20.

Finally, for illustration of an exemplary use of the electric conductors 1, FIG. 6 in turn shows a laminated core 19 of a stator 30 with electric conductors 1 arranged in grooves 20 of the laminated core, wherein the electric conductors 1 are connected, for example welded, into an electric winding 29 here. In the embodiment shown in FIG. 6, electric conductors 1 which are configured according to FIG. 2 are shown in an arranged and interconnected form by way of example. For the sake of clarity, the laminated core 19 of the stator 30 and the electric winding 29 are only partially shown in FIG. 6, and only a part of the winding 29, i.e. a partial winding, is shown. Such windings 29 are common in electric machines, such as electric motors or generators. It is essential in this regard that such windings are manufactured from electric conductors 1 according to the embodiments described above based on FIGS. 1-4.

The embodiments show possible variations; however, it should be noted at this point that the invention is not limited to its variations specifically shown; rather, various combinations of the individual variations are possible, and this variation possibility based on the technical teaching of the present invention is subject to the skills of the person skilled in the art active in this technical field.

The scope of protection is determined by the claims. However, the description and the drawings are to be used for construing the claims. The individual features or feature combinations of the different embodiments shown and described may constitute independent inventive solutions. The object underlying the independent inventive solutions may be gathered from the description.

All indications of ranges of values in the present description are to be understood such that they also include any and all sub-ranges therefrom; for example, the indication 1 to 10 is to be understood such that all sub-ranges are included, starting at the lower limit 1 up to the upper limit 10, i.e. all sub-ranges start with a lower limit of 1 or larger and end at an upper limit of 10 or less, e.g. 1 to 1.7, or 3.2 to 8.1, or 5.5 to 10.

As a matter of form, it should finally be noted that for better understanding of the structure, some of the elements have been represented unscaled and/or enlarged and/or in reduced size.

LIST OF REFERENCE NUMBERS

1 Electric conductor
2 Conductor core
3 Total longitudinal extension
4 End
5 End
6 Longitudinal end faces
7 Longitudinal end face
8 Transverse end face
9 Transverse end face
10 Insulation layer
11 Layer thickness
12 Layer thickness
13 Total cross-sectional area
14 Total cross-sectional area
15 Bend
16 Support layer
17 Layer thickness
18 Total cross-sectional area
19 Laminated core
20 Groove
21 Circumferential direction
22 Longitudinal direction
23 Radial direction
24 Longitudinal axis
25 Air gap
26 Tooth tip
27 Groove base
28 Longitudinal extension
29 Winding
30 Stator

The invention claimed is:

1. An electric conductor (1) for use in electric machines, comprising
   an electrically conductive conductor core (2) having a substantially rectangular cross-section, wherein the conductor core (2) comprises two longitudinal end faces (6, 7) arranged opposite one another and two transverse end faces (8, 9) arranged opposite one another as well as a total longitudinal extension (3) between a first end (4) and a second end (5) of the conductor core (2),
   at least one insulation layer (10), which insulation layer (10) is arranged around the full circumference of the conductor core (2) at least over a predominant part of the total longitudinal extension (3) of the conductor core (2),
   wherein
   the at least one insulation layer (10) predominantly comprises an extrudable, polymer, thermoplastic material selected from the group of aromatic polysulfones (PAES) or mixtures of aromatic polysulfones (PAES); and
   the at least one insulation layer (10) has a total cross-sectional area (13) which is 0.1 to 0.18 times a total cross-sectional area (14) of the conductor core (2).

2. The electric conductor according to claim 1, wherein the at least one insulation layer (10) comprises a material having a relative permittivity of less than 4 at a frequency of 0.1 kHz to 100 kHz and a temperature of −50° C. to 180° C., measured according to IEC 60250.

3. The electric conductor according to claim 1, wherein the material of the at least one insulation layer (10) has a glass transition temperature above 160° C.

4. The electric conductor according to claim 1, wherein the at least one insulation layer (10) comprises a material having a heat deflection temperature according to ISO 75-1, -2, -3, method A of at least 170° C.

5. The electric conductor according to claim 1, wherein the at least one insulation layer (10) has a dielectric strength according to IEC 60243-1 of at least 28 kV/mm at a layer thickness of less than 500 μm.

6. The electric conductor according to claim 1, wherein the at least one insulation layer (10) predominantly comprises polysulfone (PSU), polyethersulfone (PES or PESU) or polyphenylene sulfone (PPSU) or of mixtures of these aromatic polysulfones (PAES).

7. The electric conductor according to claim 1, wherein, in the area of the transverse end faces (8, 9), the at least one insulation layer (10) has a layer thickness (11) which is 2 to 8 times a layer thickness (12) of the at least one insulation layer (10) in the area of the longitudinal end faces (6, 7).

8. The electric conductor according to claim 1, wherein the at least one insulation layer (10) is applied to the conductor core (2) by means of extrusion.

9. The electric conductor according to claim 1, wherein the at least one insulation layer (10) is completely coated with a support layer (16).

10. The electric conductor according to claim 9, wherein the support layer (16) predominantly comprises polysulfone (PSU), polyethersulfone (PES or PESU), polyphenylene sulfone (PPSU) or polyaryletherketone (PAEK) or of mixtures of these thermoplastic polymers.

11. The electric conductor according to claim 9, wherein the support layer (16) comprises a material having an elongation at break according to ISO 527-1, -2 of 50% or more.

12. The electric conductor according to claim 9, wherein the support layer (16) comprises a material having a heat deflection temperature according to ISO 75-1, -2, -3, method A of at least 170° C.

13. The electric conductor according to claim 9, wherein a layer thickness (17) of the support layer (16) is substantially uniform around the circumference of the at least one insulation layer (10) and 0.6 to 1.0 times a layer thickness (12) of the at least one insulation layer (10) in the area of the longitudinal end faces (6).

14. The electric conductor according to claim 9, wherein the support layer (16) has a total cross-sectional area (18) which is 0.22 to 0.35 times a total cross-sectional area (13) of the at least one insulation layer (10).

15. The electric conductor according to claim 9, wherein the support layer (16) is applied to the at least one insulation layer (10) by means of extrusion.

16. An electric winding (29) for an electric machine, wherein the winding is manufactured from an electric conductor (1) or multiple interconnected electric conductors (1), and wherein each electric conductor (1) is configured according to claim 1.

17. A stator (30) for an electric machine, comprising
   a laminated core (19) having multiple grooves (20) continuously extending in the circumferential direction (21) around a longitudinal axis (24) of the laminated core (19) and in a longitudinal direction (22) of the laminated core (19), with at least two electric conductors (1) received in each groove (20) for forming an electric winding (29), wherein the electric conductors (1) received in the grooves (20) are configured according to claim 1.

18. The stator according to claim 17, wherein the respective conductors (1) received in the grooves (20) are completely coated with the at least one insulation layer (10) at least over a total longitudinal extension (28) of a respective groove (20).

19. An electric conductor (1) for use in electric machines, comprising an electrically conductive conductor core (2) having a substantially rectangular cross-section, wherein the conductor core (2) comprises two longitudinal end faces (6, 7) arranged opposite one another and two transverse end faces (8, 9) arranged opposite one another as well as a total longitudinal extension (3) between a first end (4) and a second end (5) of the conductor core (2), at least one insulation layer (10), which insulation layer (10) is arranged around the full circumference of the conductor core (2) at least over a predominant part of the total longitudinal extension (3) of the conductor core (2), wherein the at least one insulation layer (10) predominantly comprises an extrudable, polymer, thermoplastic material selected from the group of aromatic polysulfones (PAES) or mixtures of aromatic polysulfones (PAES);

the at least one insulation layer (10) is completely coated with a support layer (16); and the support layer (16) predominantly comprises an extrudable, polymer, thermoplastic material selected from the group of aromatic polysulfones (PAES) or polyaryletherketone (PAEK) or of mixtures of these materials.

\* \* \* \* \*